(12) United States Patent
Da et al.

(10) Patent No.: US 11,452,065 B2
(45) Date of Patent: Sep. 20, 2022

(54) POSITIONING METHOD AND APPARATUS (71) Applicant: DATANG MOBILE COMMUNICATIONS EQUIPMENT CO., LTD., Beijing (CN)

(72) Inventors: Ren Da, Beijing (CN); Fang-Chen Cheng, Beijing (CN); Xueyuan Gao, Beijing (CN); Hui Li, Beijing (CN); Qiubin Gao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 0 days.

(21) Appl. No.: 15/734,028

(22) PCT Filed: May 29, 2019

(86) PCT No.: PCT/CN2019/089138
§ 371 (c)(1),
(2) Date: Dec. 1, 2020

(87) PCT Pub. No.: WO2019/228425
PCT Pub. Date: Dec. 5, 2019

(65) Prior Publication Data
US 2021/0219259 A1 Jul. 15, 2021

(30) Foreign Application Priority Data
Jun. 1, 2018 (CN) .................... 201810558533.X (51) Int. Cl.
*H04W 64/00* (2009.01)
*H04W 4/33* (2018.01)
(Continued)

(52) U.S. Cl.
CPC .......... *H04W 64/006* (2013.01); *H04W 4/33* (2018.02); *H04W 72/048* (2013.01); *H04W 72/0446* (2013.01); *H04W 4/021* (2013.01)

(58) Field of Classification Search
CPC . H04W 64/006; H04W 4/33; H04W 72/0446; H04W 72/048; H04W 4/021
See application file for complete search history.

(56) References Cited

U.S. PATENT DOCUMENTS

| 2014/0349677 | A1* | 11/2014 | Xiao | H04W 4/02 455/456.1 |
|---|---|---|---|---|
| 2017/0289953 | A1 | 10/2017 | Chae | |
| 2020/0236644 | A1* | 7/2020 | Gunnarsson | G01S 5/0236 |

FOREIGN PATENT DOCUMENTS

| CN | 103703841 A | 4/2014 |
|---|---|---|
| CN | 105393612 A | 3/2016 |

(Continued)

OTHER PUBLICATIONS

3GPP TSG-RAN WG1 Meeting #80bis R1-151422 (Year: 2015).*
(Continued)

*Primary Examiner* — Ernest G Tacsik
(74) *Attorney, Agent, or Firm* — Meunier Carlin & Curfman LLC (57) ABSTRACT

Disclosed by the present application are a positioning method and apparatus, which are used to improve indoor positioning performance and precision without occupying a large amount of system resources. At a positioning server side, a positioning method provided by an embodiment of the present application comprises: acquiring a positioning capability supported by a user equipment (UE), and determining, according to the positioning capability, that the UE may obtain a positioning measurement value by means of detecting a positioning reference signal ioPRS that is used for indoor/outdoor positioning; acquiring positioning auxiliary data comprising ioPRS configuration data, and sending the positioning auxiliary data to the UE; acquiring the positioning measurement value that is provided by the UE (Continued)

and that is acquired on the basis of the ioPRS, and using the positioning measurement value to position the UE.

14 Claims, 6 Drawing Sheets

(51) Int. Cl.
*H04W 72/04* (2009.01)
*H04W 4/021* (2018.01)

(56) References Cited

FOREIGN PATENT DOCUMENTS

| CN | 105548960 A | 5/2016 |
|----|-------------|--------|
| CN | 106507471 A | 3/2017 |
| CN | 107439020 A | 12/2017 |

OTHER PUBLICATIONS

International Search Report for International Application No. PCT/CN2019/089138 dated Aug. 28, 2019.

Qualcomm Incorporated, "3GPP TSG-RAN WGI Meeting #80bis R1-151422" OTDOA Positioning Enhancements, Apr. 24, 2015.

Ericsson,"3GPP TSG-RAN WG2 #99 Tdoc R2-1708601" NR support on RAT-independent and E-UTRAN-dependent positioning methods, Aug. 25, 2017.

Xingqin et al., "Positioning for the Internet of Things: A 3GPP Perspective," IEEE Communication Magazine, Sep. 11, 2017.

Qualcomm Europe, "Use cases and benefits for UE-based OTDOA," 3GPP TSG-RAN WG2 #67, R2-094973, Aug. 24-28, 2009, Shenzhen, China.

Fischer, Sven, "Introduction to OTDOA on LTE Networks," Qualcomm Technologies, Inc., Aug. 7, 2014.

* cited by examiner

POSITIONING METHOD AND APPARATUS

The application is a US National Stage of International Application No. PCT/CN2019/089138, filed May 29, 2019, which claims priority to Chinese Patent Application No. 201810558533.X, filed with the Chinese Patent Office on Jun. 1, 2018 and entitled "Positioning Method and Apparatus", which is hereby incorporated by reference in its entirety.

FIELD

The application relates to the field of communication technologies, and particularly to a positioning method and apparatus.

BACKGROUND

The Observed Time Difference of Arrival (OTDOA) is a method in the 3GPP to use the downlink reference signal time difference measurement for positioning. In this method, a User Equipment (UE) measures the reference signals transmitted by a serving cell and a neighbor cell to obtain the Reference Signal Time Difference Measurement (RSTD) value, and reports the RSTD measurements to a network location server. The network location server then determines the position of the UE by the multipoint positioning algorithm or other algorithms.

In order to provide the fine OTDOA positioning performance, the 3GPP defines the Positioning Reference Signal (PRS) for supporting the OTDOA, to help the UE to detect the downlink reference signals from a sufficient number of neighbor cells.

However, the existing PRS needs to occupy a large amount of system resources, and otherwise it is difficult to ensure the performance and accuracy of the positioning system, especially for the positioning in the indoor environment.

SUMMARY

The embodiments of the application provide a positioning method and apparatus, so as to improve the indoor positioning performance and accuracy without occupying a large amount of system resources.

At the location server side, a positioning method according to an embodiment of the application includes:

obtaining a positioning capability supported by a UE, and determining, according to the positioning capability, that the UE is capable of obtaining positioning measurements by detecting an indoor/outdoor Positioning Reference Signal (ioPRS) for indoor/outdoor positioning;

obtaining positioning assistance data including ioPRS configuration data, and transmitting the positioning assistance data to the UE;

obtaining the positioning measurements provided by the UE, and positioning the UE based on the positioning measurements, wherein the positioning measurements are obtained by the UE based on the ioPRS.

Optionally, the ioPRS includes: a first PRS and a second PRS, wherein the Energy Per Resource Element (EPRE) of the first PRS is greater than the EPRE of the second PRS.

Optionally, the second PRS is transmitted together with signals for data communication service.

Optionally, the first PRS and the second PRS are alternately transmitted in time.

Optionally, the time-domain configuration of the second PRS is Orthogonal Frequency Division Multiplexing (OFDM) symbols except OFDM symbols for transmitting the first PRS.

Optionally, the transmission bandwidth and positions of the second PRS are the same as or different from the transmission bandwidth and positions of the first PRS;

or the second PRS occupies an entire carrier bandwidth.

Optionally, Resource Element (REs) of the second PRS are distributed in a transmission bandwidth of the second PRS, and there is one RE of the second PRS in every three REs;

or REs of the second PRS are distributed in a transmission bandwidth of the second PRS, and there is one RE of the second PRS in every six REs;

or REs of the second PRS occupy all REs in a transmission bandwidth of a PRS-L.

Correspondingly, at the base station side, a positioning method according to an embodiment of the application includes:

receiving an OTDOA information request transmitted by a location server;

transmitting an OTDOA information response carrying positioning assistance data to the location server, wherein the positioning assistance data includes ioPRS configuration data, the ioPRS is for indoor/outdoor positioning.

Optionally, the method further includes: transmitting downlink signals including the ioPRS according to the ioPRS configuration data.

Optionally, the ioPRS includes: a first PRS and a second PRS, wherein the EPRE of the first PRS is greater than the EPRE of the second PRS.

Optionally, the second PRS is transmitted together with signals for data communication service.

Optionally, the first PRS and the second PRS are alternately transmitted in time.

Optionally, the time-domain configuration of the second PRS is OFDM symbols except OFDM symbols for transmitting the first PRS.

Optionally, a transmission bandwidth and positions of the second PRS are the same as or different from a transmission bandwidth and positions of the first PRS:

or the second PRS occupies an entire carrier bandwidth.

Optionally, REs of the second PRS are distributed in a transmission bandwidth of the second PRS, and there is one RE of the second PRS in every three REs:

or REs of the second PRS are distributed in a transmission bandwidth of the second PRS, and there is one RE of the second PRS in every six REs;

or REs of the second PRS occupy all REs in a transmission bandwidth of a PRS-L.

Correspondingly, at the UE side, a positioning method according to an embodiment of the application includes:

reporting a positioning capability supported by a UE to a network side, wherein the positioning capability is used by the network side to determine that the UE is capable of obtaining positioning measurements by detecting an ioPRS for indoor/outdoor positioning:

obtaining positioning assistance data including ioPRS configuration data;

measuring downlink signals including the ioPRS based on the ioPRS configuration data to obtain positioning measurements, and reporting the positioning measurements to the network side.

A positioning apparatus according to an embodiment of the application includes:

a memory configured to store program instructions;

a processor configured to invoke the program instructions stored in the memory and perform any one of the said methods according to the embodiments of the application.

At the location server side, a positioning apparatus according to an embodiment of the application includes:

a first unit configured to obtain a positioning capability supported by a UE, and determine, according to the positioning capability, that the UE is capable of obtaining positioning measurements by detecting an ioPRS for indoor/outdoor positioning;

a second unit configured to obtain positioning assistance data including ioPRS configuration data, and transmit the positioning assistance data to the UE;

a third unit configured to obtain the positioning measurements provided by the UE, and position the UE based on the positioning measurements, wherein the positioning measurements are obtained by the UE based on the ioPRS.

At the base station side, a positioning apparatus according to an embodiment of the application includes:

a receiving unit configured to receive an OTDOA information request transmitted by a location server;

a transmitting unit configured to transmit an OTDOA information response carrying positioning assistance data to the location server, wherein the positioning assistance data includes ioPRS configuration data, and the ioPRS is for indoor/outdoor positioning.

At the UE side, a positioning apparatus according to an embodiment of the application includes:

a reporting unit configured to report a positioning capability supported by a UE to a network side, wherein the positioning capability is used by the network side to determine that the UE is capable of obtaining positioning measurements by detecting an ioPRS for indoor/outdoor positioning;

an obtaining unit configured to obtain positioning assistance data including ioPRS configuration data:

a measurement unit configured to measure downlink signals including the ioPRS based on the ioPRS configuration data to obtain positioning measurements, and report the positioning measurements to the network side.

Another embodiment of the application provides a computing device, which includes a memory and a processor, wherein the memory is configured to store the program instructions, and the processor is configured to invoke the program instructions stored in the memory and perform any one of the above methods.

Another embodiment of the present application provides a computer storage medium storing the computer executable instructions which are configured to cause the computer to perform any one of the above methods.

BRIEF DESCRIPTION OF THE DRAWINGS

In order to illustrate the technical solutions in the embodiments of the application more clearly, the accompanying figures which need to be used in describing the embodiments will be introduced below briefly. Obviously the accompanying figures described below are only some embodiments of the application, and other accompanying figures can also be obtained by those ordinary skilled in the art according to these accompanying figures without creative labor.

DETAILED DESCRIPTION

The embodiments of the application provide a positioning method and apparatus, so as to improve the indoor positioning performance and accuracy without occupying a large amount of system resources.

In the traditional PRS design, the PRS signal from a cell is transmitted periodically in the pre-configured pattern. The transmission power (Energy Per Resource Element (EPRE)) of each PRS Resource element (RE) is the same, and the PRS EPRE generally cannot be less than the EPRE of other broadcast data or reference signal, because the UE needs to detect at least PRSs from three cells to achieve the purpose of determining the position of the UE. The main problem of the traditional PRS is that the PRS signal needs to occupy a large amount of system resources, and otherwise it is difficult to ensure the performance and accuracy of the positioning system, especially for the positioning in the indoor environment.

In order to support the improvement of the indoor positioning performance and accuracy without occupying a large amount of system resources, on the basis of the traditional PRS, the indoor/outdoor Positioning Reference Signal (ioPRS) suitable for supporting the LTE and 5G New Radio system (5G NR) is proposed in the embodiments of the application.

Design of the ioPRS.

Figure 1:
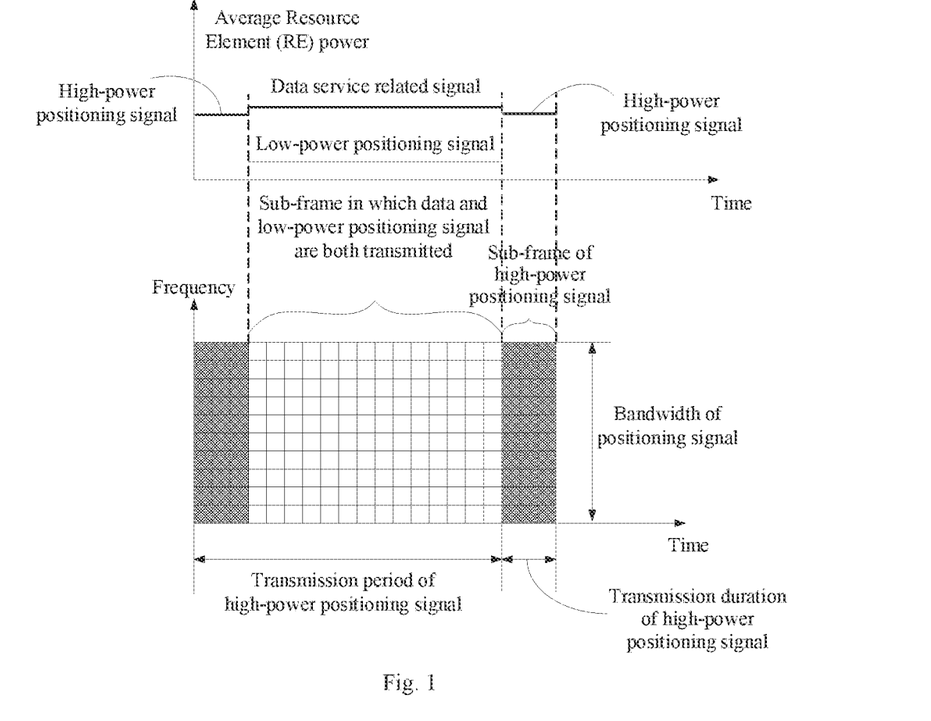
FIG. 1 is a schematic diagram of the ioPRS transmission according to an embodiment of the application.

As shown in FIG. 1, the ioPRS signal includes two sets of PRS signals: one is a PRS with high EPRE (which can be called high-power positioning reference signal (PRS-H for short)), and the other is a PRS with very low EPRE (which can be called low-power positioning reference signal (PRS-L for short)), wherein the EPRE of the PRS-H is higher than the EPRE of the PRS-L, and may be higher than the data part. The value of the EPRE may be configured by the network according to actual needs. Similarly, the EPRE of the PRS-L is lower than the EPRE of the PRS-H, and may be lower than the data part. The value of the EPRE may be configured by the network according to actual needs. The PRS-H is similar to the traditional PRS, that is, it is transmitted at the configured higher power and transmitted according to the configured period and duration. The PRS-L is a newly proposed positioning reference signal with very low EPRE. The PRS-L is mixed and transmitted with the signal used for data communication service. The EPRE of the PRS-L is much lower than the signal of data communication service to avoid any significant interference to conventional data services.

The PRS-H is mainly used for the purpose of: supporting the UE to obtain the high-precision time and frequency synchronization with the base station by detecting the PRS-H from one or more neighbor cells. The high-precision time and frequency synchronization is a necessary condition for the UE to perform the long-term coherent integration on the PRS-L signal to detect the PRS-L signal.

If the UE happens to be located so that it can detect the PRSs-H from multiple neighbor cells (for example, outdoor), the UE can also obtain the RSTD measurements from these neighbor cells by detecting the PRS-H to quickly determine the UE's approximate position.

The PRS-L is mainly used for the purpose of: supporting the UE to detect the PRSs-L from multiple neighbor cells through the long-term coherent or non-coherent integration. Since the UE has obtained the high-precision time and frequency synchronization with the base station by detecting the PRS-H, and the mobility of the UE in the indoor environment is low, these conditions allow the UE to improve the signal to noise ratio through the long-term coherent or incoherent integration, to detect the continuously transmitted PRS-L with low EPRE. Then, the UE can obtain more RSTD measurements of neighbor cells than the case of detecting only the PRS-H. Thus, the positioning performance of the indoor environment can be improved.

Due to the alternate transmissions of PRS-H and PRS-L in time, the PRSs transmitted by the base station are actually continuous. Then, it is possible for the UE to continuously measure and track the PRSs from multiple neighbor cells to achieve the continuous positioning and tracking. The very high and even centimeter-level positioning accuracy can be achieved through the carrier phase measurement.

The design of the ioPRS can reduce the system resources used for the PRSs in the actual OTDOA system while ensuring the certain OTDOA positioning performance. In the traditional PRS design, the UE is required to be able to detect at least the PRSs from three cells to achieve the purpose of determining the position of the UE. In the design of the ioPRS, the main purpose of the PRS-H transmission is to provide the high-precision time and frequency synchronization for the UE but not to determine the position of the UE. This purpose can be achieved only by detecting the PRS-H from one cell. Then, the PRS-H transmission may be configured to have the longer periodicity and/or shorter PRS-H transmission duration than the traditional PRS without the PRS-L transmission. The UE detects the PRS-L signals from multiple neighbor cells through the long-term coherent or non-coherent integration. Since the PRS-L is mixed and continuously transmitted with the signal of data communication service, and the signal transmission power of the PRS-L is much lower than the signal transmission power of the data communication service, the transmitting of the PRS-L signal basically does not occupy the system resources.

Compared with the traditional PRS, the ioPRS has the following advantages:

reducing the system resources used for PRS in the actual OTDOA system;

providing the better positioning performance, especially suitable for the indoor environment where the UE is in slow motion and static state, which makes it possible to use the long-term integration of relatively weak PRSs to obtain the high positioning performance or even position based on the carrier phase.

The configuration method of the configuration data of the ioPRS signal is introduced as follows.

The PRS-L signal and PRS-H signal may be configured separately.

The configuration parameters of the PRS-H signal.

Figure 2:
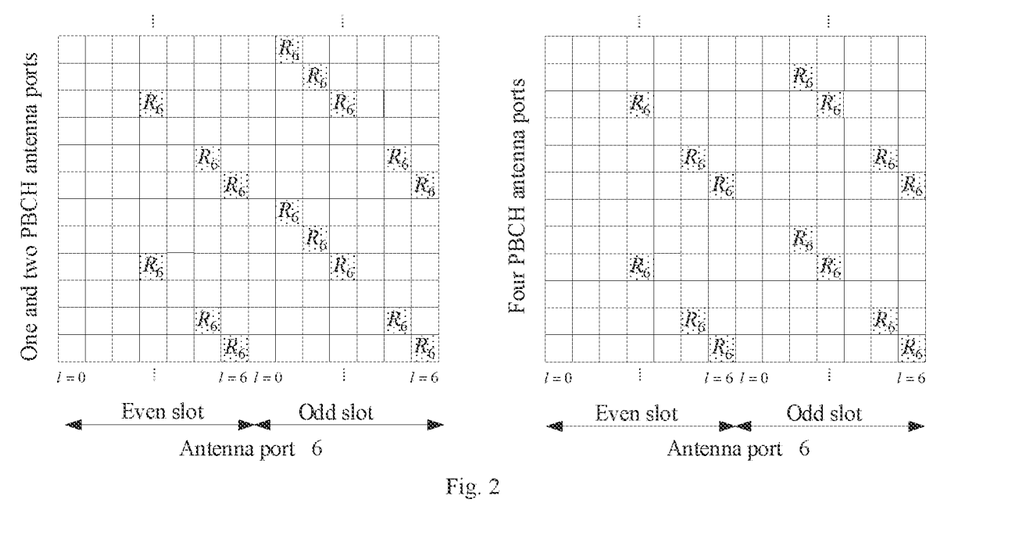
FIG. 2 is a schematic diagram of a configuration method of configuration parameters of the PRS-H signal when being used in the LTE according to an embodiment of the application.

The configuration methods of the PRS-H signal in time domain, frequency domain and transmission power are similar to those of the traditional PRS signal. When the PRS-H signal is used in the Long Time Evolution (LTE), the configuration method of its configuration parameters is shown in FIG. 2, where each symbol occupies 2 REs, and the number of symbols occupied is related to the number of ports of the Physical Broadcast Channel (PBCH).

Figure 3:
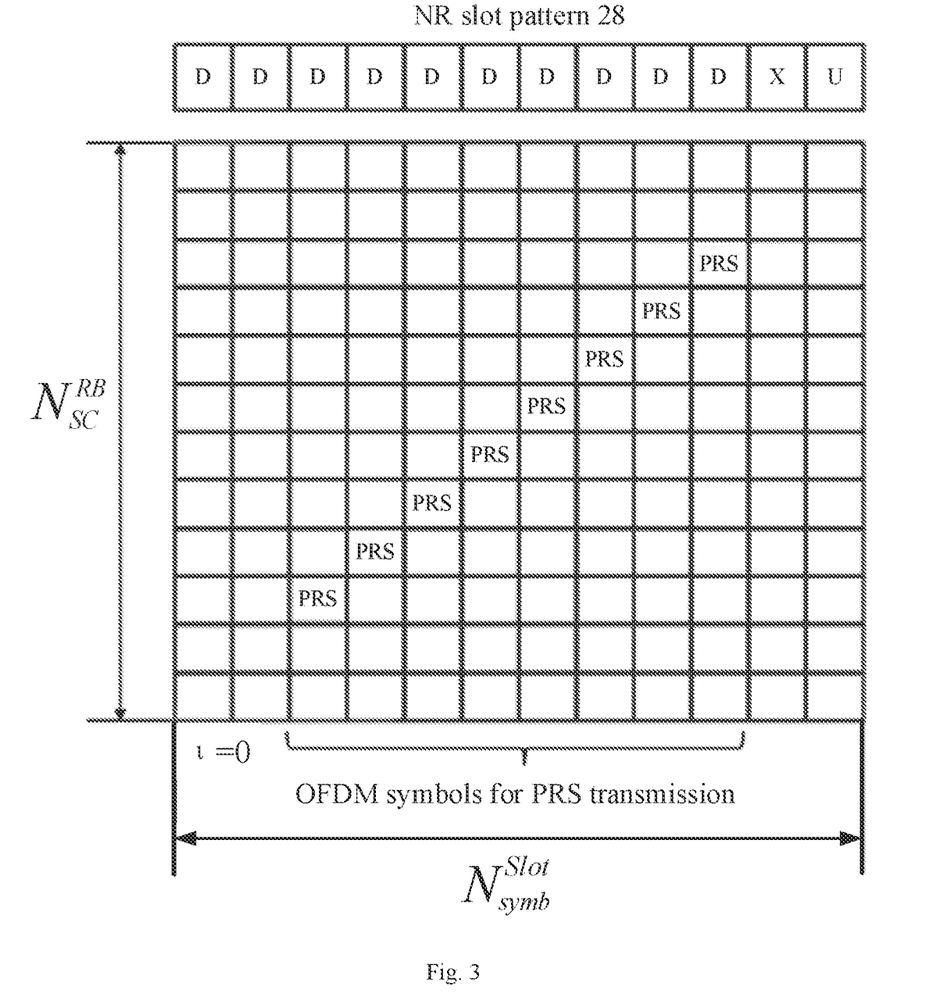
FIG. 3 is a schematic diagram of a configuration method of configuration parameters of the PRS-H signal when being used in the 5G NR according to an embodiment of the application.

When the PRS-H is used in 5G NR, the configuration method of its configuration parameters is shown in FIG. 3. One of the schemes is as follows, for example, FIG. 3 uses an example of PRS OFDM symbols in the configuration slot. The actual symbol occupancy and RE occupancy are both configurable. In FIG. 3, it is assumed that the NR slot format with configuration index of 28 in Table 4.3.2-3 in TS 38.211 is used. In this format, the first 12 OFDM symbols are 'D' symbols. The last two OFDM symbols are symbols 'X' and 'U'; the configuration index 2 of PRS slot symbol in Table 1 (which may be assumed to be Table 11.1.1-1 in TS38.213) is used, which indicates the first two symbols 'D' are not used for the PRS; and the RE density on one OFDM symbol is $C_{PRS}=1$, that is, there is only one PRS RE on each OFDM symbol.

The configuration parameters of the PRS-L are introduced as follows.

The time-domain configuration of the PRS-L signal can select the following method:

the time-domain configuration of the PRS-L is OFDM symbols except those for transmitting the PRS-H.

The transmission power of the PRS-L may be configured in the following way:

1) configuring through the power offset relative to the PRS-H:

2) configuring through the absolute power amount.

When there is no need to support the indoor positioning scenarios, the zero power may be used to turn off the PRS-L.

The frequency-domain configuration of the PRS-L includes transmission bandwidth, position and density.

The transmission bandwidth and positions of the PRS-L may be configured through the following schemes.

Scheme 1: the transmission bandwidth and positions of the PRS-L are the same as the transmission bandwidth and positions of the PRS-H.

Scheme 2: the PRS-L occupies the entire carrier bandwidth, regardless of configuration of the transmission bandwidth of the PRS-H.

The PRS RE density of the PRS-L in each PRS RB may be configured through the following schemes.

Scheme 1: the PRS-L REs are distributed (optionally, may be evenly distributed) in the transmission bandwidth of the PRS-L, and there is one PRS-L RE in every three REs.

Scheme 2: the PRS-L REs are distributed (optionally, may be evenly distributed) in the transmission bandwidth of the PRS-L, and there is one PRS-L RE in every six REs.

Scheme 3: the PRS-L REs occupy all the REs in the transmission bandwidth of the PRS-L.

In addition, for the REs that have been configured to support the OFDM data communication reference signals, e.g., system time and frequency synchronization signals, it is also possible to determine whether to transmit the PRS-L according to the design requirements of the system.

The positioning implementation method based on the ioPRS is introduced as follows.

The proposed ioPRS signal can support the OTDOA positioning process defined in the existing specifications, for example, the LTE OTDOA positioning process defined in the 3GPP or the NG-RAN OTDOA positioning process defined in the 3GPP.

Figure 4:
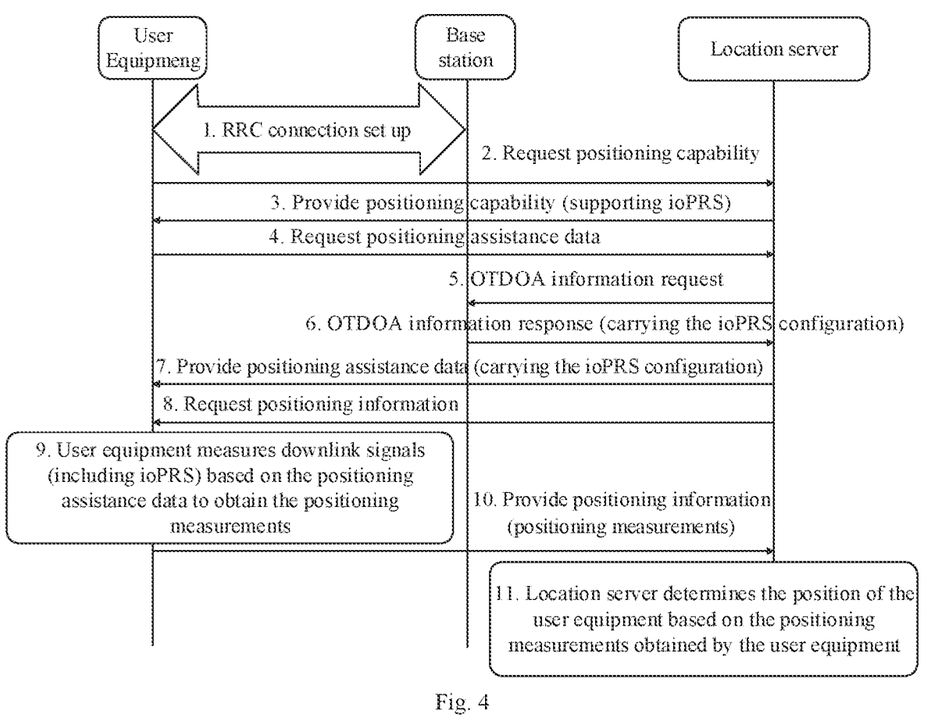
FIG. 4 is a schematic diagram of an OTDOA positioning process according to an embodiment of the application.

FIG. 4 is a schematic diagram of a basic OTDOA positioning process according to an embodiment of the application. In the LTE positioning system, the BS (Base Station) and location server in FIG. 4 are eNode B and Evolved Serving Mobile Location Center (E-SMLC). In the NG Radio Access Network (NG-RAN) positioning system, the Base station (BS) and location server in FIG. 4 are Next Generation Node B (gNode B) and Location Management Function (LMF) entity, respectively.

Referring to FIG. 4, the basic OTDOA positioning process based on the ioPRS includes the following steps.

Step 1: a UE sets up a connection with the BS, and the UE is in the Radio Resource Control Connection (RRC_CONNECTED) state.

Step 2: the location server transmits a Request Capabilities message to the UE, and requests the UE to notify the server of the positioning function that the UE can support.

Step 3: the UE transmits a Provide Capabilities message to respond to the location server. The OTDOA based on the ioPRS needs to modify the existing Provide Capabilities message and add a capability to report whether the UE (i.e., terminal) supports the capability to receive the low-power PRS, so that the UE can notify the location server of whether the UE supports the detection of the ioPRS to obtain the RSTD measurements.

Step 4: the UE transmits a Request Assistance Data message to the location server when the downlink positioning assistance data is required. This message includes requesting the location server to provide the OTDOA assistance data.

Step 5: the location server transmits an OTDOA Information Request to the BS, to request the BS to provide the downlink positioning assistance data, e.g., ioPRS configuration data including the configuration parameters of the PRS-L and/or PRS-H.

Step 6: the BS transmits an OTDOA Information Response to the location server, to provide the requested downlink positioning assistance data to the location server, including the ioPRS configuration data. The existing OTDOA message can be modified to allow the BS to provide the ioPRS configuration data to the server.

Step 7: the location server provides the positioning assistance data (carrying the ioPRS configuration data therein) requested by the UE in the Provide Assistance Data.

Step 8: the location server transmits a Request Location Information message to the UE. This message requests the UE to measure the downlink of the BS and return the measured positioning measurements.

Step 9: the UE measures the downlink signal based on the positioning assistance data (for example, ioPRS configuration data) to obtain the positioning measurements (for example, RSTD).

Step 10: the UE transmits a Provide Location Information message to the location server, where this message includes the positioning measurements (for example, RSTD) obtained by measuring the downlink signal.

Step 11: the location server determines the position of the UE based on the positioning measurements obtained by the UE.

In summary, the implementation processes at the network side and user equipment side are respectively as follows.

At the network side.

The network side configures the parameters for transmitting the ioPRS, that is, presets ioPRS configuration data, for each base station cell. The ioPRS configuration data includes: the configurations of the PRS-H in the time domain, frequency domain, and transmission power, and the configurations of the PRS-L in the time domain, frequency domain, and transmission power.

Each base station cell transmits the PRS-H and PRS-L based on the ioPRS configuration data.

When the location server needs to provide the positioning service for the UE, the location server transmits a Request Capabilities message to the UE to request the UE to notify the server of the positioning function that the UE can support.

The location server receives a Provide Capabilities message transmitted by the UE, where this message carries the information such as support for ioPRS.

The location server transmits an OTDOA Information Request to each Base Station (BS), to request the BS to provide the downlink positioning assistance data, e.g., the ioPRS configuration data.

After receiving the OTDOA Information Request, the BS transmits an OTDOA Information Response to the location server to provide the location server with the requested downlink positioning assistance data, including the ioPRS configuration data, i.e., the parameters for transmitting the ioPRS configured for the base station cell described above.

After receiving the Information Response transmitted by the BS, the location server transmits a Provide Assistance Data message to the UE to provide the positioning assistance data (including the ioPRS configuration data), and transmits a Request Location Information message to the UE to request the UE to measure the downlink of the BS and report the measured positioning measurements.

The location server determines the position of the UE based on the positioning measurements provided by the UE in the Provide Location Information and the BS information (including the ioPRS configuration data) provided by the BS in the OTDOA Information Response.

Figure 5:
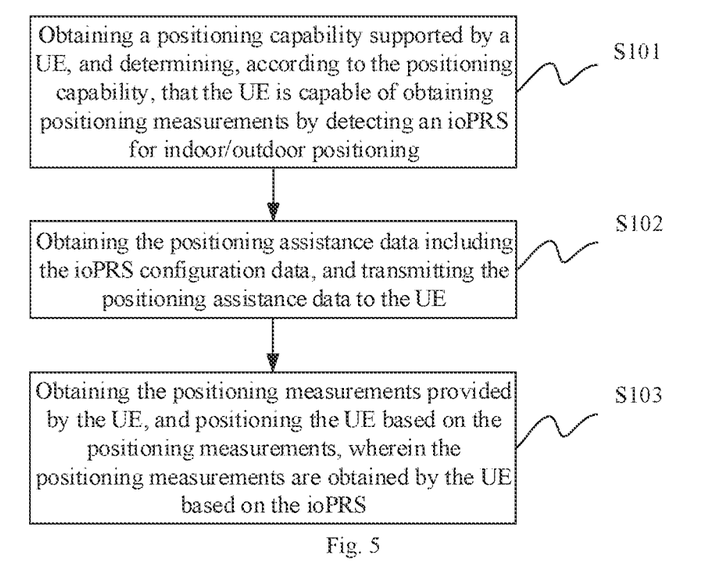
FIG. 5 is a flow schematic diagram of a positioning method at the location server side according to an embodiment of the application.

Therefore, referring to FIG. 5, at the location server side, a positioning method according to an embodiment of the application includes the following steps.

S101: obtaining a positioning capability supported by a UE, and determining, according to the positioning capability, that the UE is capable of obtaining positioning measurements by detecting an ioPRS for indoor/outdoor positioning.

For Example.

When the location server needs to provide the positioning service for the UE, the location server transmits a Request Capabilities message to the UE to request the UE to notify the server of the positioning function supported by the UE.

The location server receives a Provide Capabilities message transmitted by the UE, where this message carries the information such as support for ioPRS.

S102: obtaining the positioning assistance data, and transmitting the positioning assistance data to the UE, wherein the positioning assistance data includes the ioPRS configuration data.

The positioning assistance data is obtained, for example as follows.

The UE transmits a Request Assistance Data message to the location server when the UE needs the downlink positioning assistance data, where this message includes requesting the location server to provide the OTDOA assistance data. After the location server receives this message, the location server transmits an OTDOA Information Request to each Base Station (BS), to request the BS to provide the downlink positioning assistance data, e.g., the ioPRS configuration data.

The location server receives an OTDOA Information Response transmitted by the BS, and obtains the requested downlink positioning assistance data, including the ioPRS configuration data, i.e., the parameters for transmitting the ioPRS configured for the base station cell described above.

The positioning assistance data is transmitted to the UE, for example as follows.

After receiving the Information Response transmitted by the BS, the location server transmits a Provide Assistance Data message to the UE to provide the positioning assistance data (including the ioPRS configuration data) to the UE.

S103: obtaining the positioning measurements provided by the UE, and positioning the UE based on the positioning measurements, wherein the positioning measurements are obtained by the UE based on the ioPRS.

For Example.

The location server transmits a Request Location Information message to the UE. This message requests the UE to measure the downlink of the BS and return the measured positioning measurements.

The location server receives a Provide Location Information message transmitted by the UE, where this message includes the positioning measurements (for example, RSTD) obtained by the UE measuring the downlink signal.

The location server determines the position of the UE based on the positioning measurements obtained by the UE.

Optionally, the ioPRS includes: a first PRS and a second PRS, wherein the EPRE of the first PRS is greater than the EPRE of the second PRS.

The first PRS and the second PRS may be understood as the above PRS-H and PRS-L, respectively.

Optionally, the second PRS is transmitted together with signals for data communication service.

Optionally, the first PRS and the second PRS are alternately transmitted in time.

Optionally, the time-domain configuration of the second PRS is OFDM symbols other than those for transmitting the first PRS.

Optionally, the transmission bandwidth and positions of the second PRS are the same as or different from the transmission bandwidth and positions of the first PRS; or the second PRS occupies the entire carrier bandwidth.

Optionally, the REs of the second PRS are distributed in the transmission bandwidth of the second PRS, and there is one RE of the second PRS in every three REs. Or the REs of the second PRS are distributed in the transmission bandwidth of the second PRS, and there is one RE of the second PRS in every six REs. Or the REs of the second PRS occupy all REs in the transmission bandwidth of the PRS-L.

Figure 6:
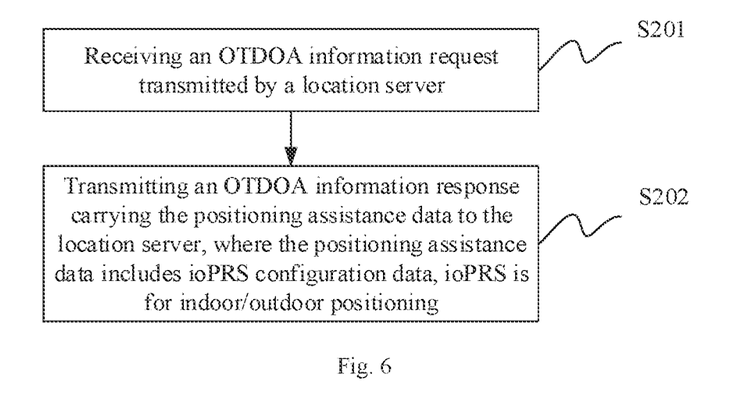
FIG. 6 is a flow schematic diagram of a positioning method at the base station side according to an embodiment of the application.

Correspondingly, at the base station side, referring to FIG. 6, a positioning method according to an embodiment of the application includes the following steps.

S201: receiving an OTDOA information request transmitted by a location server.

S202: transmitting an OTDOA information response carrying the positioning assistance data to the location server, where the positioning assistance data includes the ioPRS configuration data for indoor/outdoor positioning.

Optionally, the method further includes: transmitting downlink signals including the ioPRS according to the ioPRS configuration data.

Optionally, the ioPRS includes: a first PRS and a second PRS, wherein the EPRE of the first PRS is greater than the EPRE of the second PRS.

Optionally, the second PRS is transmitted together with signals for data communication service.

Optionally, the first PRS and the second PRS are alternately transmitted in time.

Optionally, the time-domain configuration of the second PRS is OFDM symbols other than those for transmitting the first PRS.

Optionally, the transmission bandwidth and positions of the second PRS are the same as or different from the transmission bandwidth and positions of the first PRS; or the second PRS occupies the entire carrier bandwidth.

Optionally, the REs of the second PRS are distributed in the transmission bandwidth of the second PRS, and there is one RE of the second PRS in every three REs. Or the REs of the second PRS are distributed in the transmission bandwidth of the second PRS, and there is one RE of the second PRS in every six REs. Or the REs of the second PRS occupy all REs in the transmission bandwidth of the PRS-L.

User Equipment Side.

After receiving the Request Capabilities message, the UE needs to transmit a Provide Capabilities message to respond to the location server, to notify the location server that the UE supports obtaining the RSTD measurements by detecting the ioPRS.

When the downlink positioning assistance data is needed, the UE needs to transmit a Request Assistance Data message to the location server to request the location server to provide the OTDOA assistance data.

The location server transmits a Request Location Information message to the UE. This message requests the UE to measure the downlink of the BS and return the measured positioning measurements.

The UE measures the downlink signal based on the positioning assistance data (for example, the ioPRS configuration data) provided by the location server in the Provide Assistance Data message to obtain the positioning measurements.

The UE transmits a Provide Location Information message to the location server, where this message includes the positioning measurements obtained by measuring the downlink signal and the time when the measurements are obtained.

Figure 7:
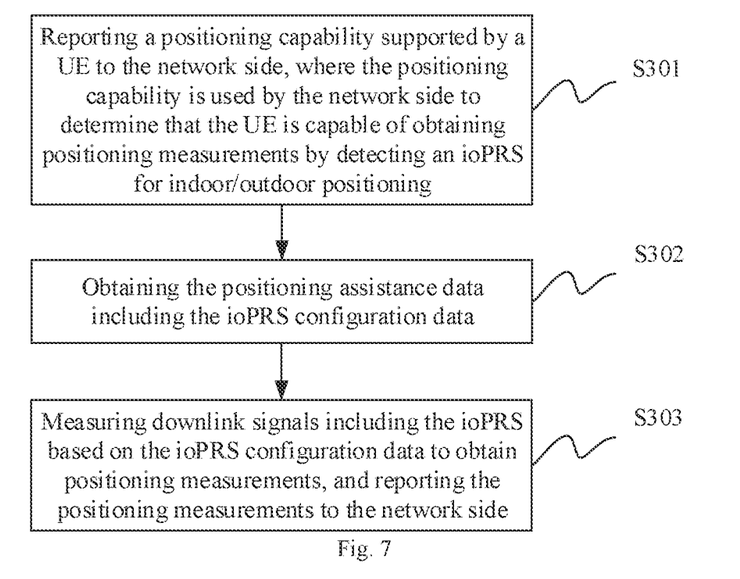
FIG. 7 is a flow schematic diagram of a positioning method at the user equipment side according to an embodiment of the application.

Correspondingly, at the user equipment side, referring to FIG. 7, a positioning method provided by an embodiment of the application includes the following steps.

S301: reporting a positioning capability supported by a UE to the network side, where the positioning capability is used by the network side to determine that the UE is capable of obtaining positioning measurements by detecting an ioPRS for indoor/outdoor positioning.

For example, after the UE receives a Request Capabilities message transmitted by the location server to request the UE to notify the server of the positioning function supported by the UE, and the positioning capability supported by the UE is reported to the network side.

S302: obtaining the positioning assistance data, wherein the positioning assistance data includes the ioPRS configuration data.

For Example.

The UE transmits a Request Assistance Data message to the location server when the downlink positioning assistance data is required. This message includes requesting the location server to provide the OTDOA assistance data.

The UE receives a Provide Assistance Data message transmitted by the location server, and obtains the positioning assistance data (including the ioPRS configuration data) requested by the UE from it.

S303: measuring downlink signals including the ioPRS based on the ioPRS configuration data to obtain positioning measurements, and reporting the positioning measurements to the network side.

For Example.

The UE measures the downlink signal based on the positioning assistance data (for example, ioPRS configuration data) to obtain the positioning measurements (for example, RSTD).

The UE transmits a Provide Location Information message to the location server, where this message includes the positioning measurements (for example, RSTD) obtained by measuring the downlink signal.

Figure 8:
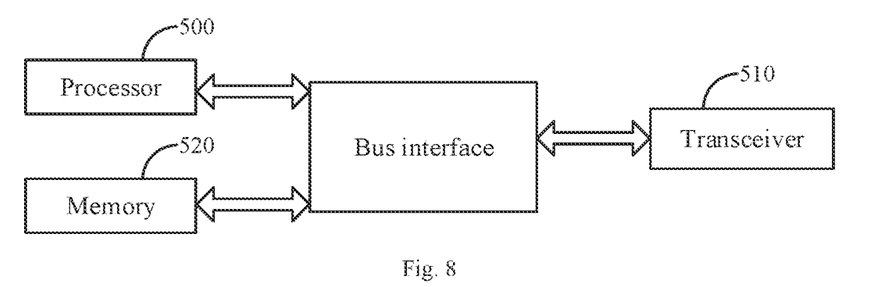
FIG. 8 is a schematic structural diagram of a positioning apparatus at the location server side according to an embodiment of the application.

Referring to FIG. 8, at the location server side, a positioning device according to an embodiment of the application includes: a memory 520 configured to store program instructions; a processor 500 configured to invoke the program instructions stored in the memory, and in accordance with the obtained program, perform the process of: obtaining a positioning capability supported by a UE and determining, according to the positioning capability, that the UE is capable of obtaining positioning measurements by detecting an ioPRS for indoor/outdoor positioning; obtaining the positioning assistance data including ioPRS configuration data, and transmitting the positioning assistance data to the UE; obtaining the positioning measurements provided by the UE, and positioning the UE based on the positioning measurements, wherein the positioning measurements are obtained by the UE based on the ioPRS.

Optionally, the ioPRS includes: a first PRS and a second PRS, wherein the EPRE of the first PRS is greater than the EPRE of the second PRS.

Optionally, the second PRS is transmitted together with signals for data communication service.

Optionally, the first PRS and the second PRS are alternately transmitted in time.

Optionally, the time-domain configuration of the second PRS is OFDM symbols except OFDM symbols for transmitting the first PRS.

Optionally, the transmission bandwidth and positions of the second PRS are the same as or different from the transmission bandwidth and positions of the first PRS; or the second PRS occupies the entire carrier bandwidth.

Optionally, the REs of the second PRS are distributed in the transmission bandwidth of the second PRS, and there is one RE of the second PRS in every three REs; or the REs of the second PRS are distributed in the transmission bandwidth of the second PRS, and there is one RE of the second PRS in every six REs; or the REs of the second PRS occupy all REs in the transmission bandwidth of the PRS-L.

The transceiver 510 is configured to receive and transmit the data under the control of the processor 500.

In FIG. 8, the bus architecture may include any numbers of interconnected buses and bridges, and specifically link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be a plurality of elements, i.e., include a transmitter and a receiver, and provide the units for communicating with various other devices over the transmission media. The processor 500 is responsible for managing the bus architecture and general processing, and the memory 520 may store the data used by the processor 500 when performing the operations.

The processor 500 may be Central Processing Unit (CPU), Application Specific Integrated Circuit (ASIC), Field-Programmable Gate Array (FPGA) or Complex Programmable Logic Device (CPLD).

Figure 9:
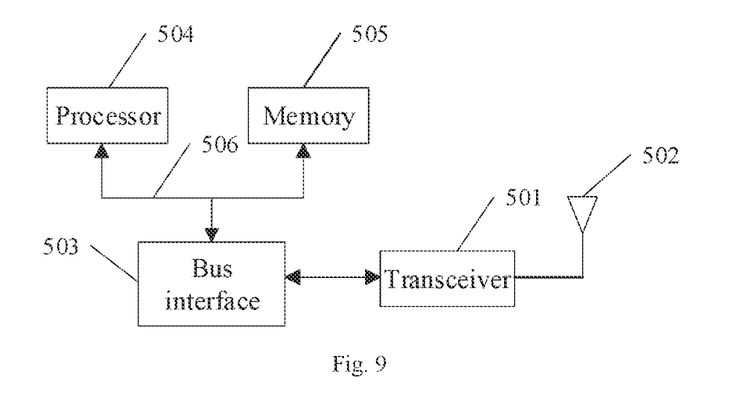
FIG. 9 is a schematic structural diagram of a positioning apparatus at the base station side according to an embodiment of the application.

Correspondingly, at the base station side, referring to FIG. 9, a positioning apparatus according to an embodiment of the application includes: a memory 505 configured to store program instructions; a processor 504 configured to invoke the program instructions stored in the memory, and in accordance with the obtained program, perform the process of: receiving an OTDOA information request transmitted by a location server via a transceiver 501: transmitting an OTDOA information response carrying the positioning assistance data to the location server via the transceiver 501, where the positioning assistance data includes the ioPRS configuration data, the ioPRS is for indoor/outdoor positioning.

Optionally, the process further includes: transmitting downlink signals including the ioPRS via the transceiver 501 according to the ioPRS configuration data.

Optionally, the ioPRS includes: a first PRS and a second PRS, wherein the EPRE of the first PRS is greater than the EPRE of the second PRS.

Optionally, the second PRS is transmitted together with signals for data communication service.

Optionally, the first PRS and the second PRS are alternately transmitted in time.

Optionally, the time-domain configuration of the second PRS is OFDM symbols except OFDM symbols for transmitting the first PRS.

Optionally, the transmission bandwidth and positions of the second PRS are the same as or different from the transmission bandwidth and positions of the first PRS; or the second PRS occupies the entire carrier bandwidth.

Optionally, the REs of the second PRS are distributed in the transmission bandwidth of the second PRS, and there is one RE of the second PRS in every three REs; or the REs of the second PRS are distributed in the transmission bandwidth of the second PRS, and there is one RE of the second PRS in every six REs; or the REs of the second PRS occupy all REs in the transmission bandwidth of the PRS-L.

The transceiver 501 is configured to receive and transmit the data under the control of the processor 504.

In FIG. 9, the bus architecture is represented by the bus 506. The bus 506 may include any numbers of interconnected buses and bridges, and the bus 506 links various circuits including one or more processors represented by the processor 504 and the memory represented by the memory 505. The bus 506 may further link various other circuits such as peripheral device, voltage regulator and power management circuit, which are all well known in the art and thus will not be further described again herein. The bus interface 503 provides an interface between the bus 506 and the transceiver 501. The transceiver 501 may be one element or a plurality of elements, e.g., a plurality of receivers and transmitters, and provide the units for communicating with various other devices over the transmission medium. The data processed by the processor 504 is transmitted over the wireless medium via the antenna 502, and further, the antenna 502 further receives the data and transfers the data to the processor 504.

The processor 504 is responsible for managing the bus 506 and the general processing, and may further provide various functions including timing, peripheral interface, voltage regulation, power management and other control functions. The memory 505 may be used to store the data used by the processor 504 when performing the operations.

Optionally, the processor 504 may be Central Processing Unit (CPU), Application Specific Integrated Circuit (ASIC), Field-Programmable Gate Array (FPGA) or Complex Programmable Logic Device (CPLD).

Figure 10:
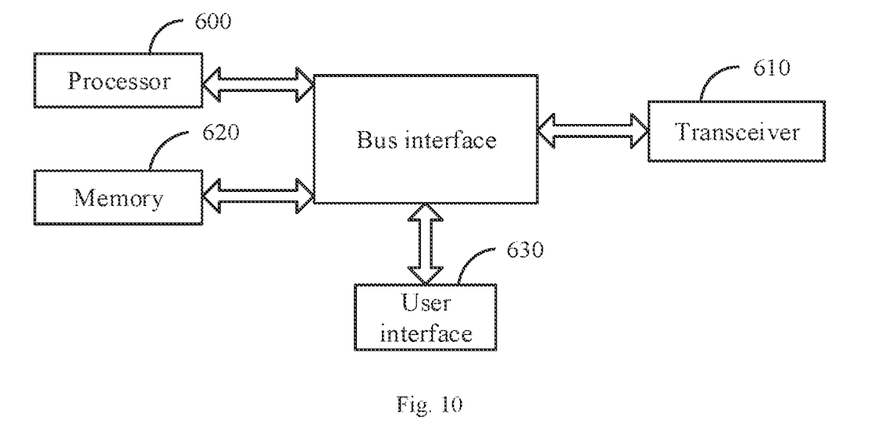
FIG. 10 is a schematic structural diagram of a positioning apparatus at the user equipment side according to an embodiment of the application.

Correspondingly, at the UE side, referring to FIG. 10, a positioning apparatus according to an embodiment of the application includes: a processor 600 configured to read the programs in a memory 620 to perform the process of: reporting the positioning capability supported by a UE to the network side via a transceiver 610, where the positioning capability is used by the network side to determine that the UE is capable of obtaining positioning measurements by detecting an ioPRS for indoor/outdoor positioning; obtaining the positioning assistance data including the ioPRS configuration data via the transceiver 610; measuring downlink signals including the ioPRS based on the ioPRS configuration data to obtain positioning measurements, and reporting the positioning measurements to the network side via the transceiver 610.

The transceiver 610 is configured to receive and transmit the data under the control of the processor 600.

In FIG. 10, the bus architecture can include any numbers of interconnected buses and bridges, and specifically link various circuits of one or more processors represented by the processor 600 and the memory represented by the memory 620. The bus architecture may further link various other circuits such as peripheral device, voltage regulator and power management circuit, which are all well known in the art and thus will not be further described again herein. The bus interface provides an interface. The transceiver 610 may be a plurality of elements, i.e., include a transmitter and a receiver, and provide the units for communicating with various other devices over the transmission medium. For different user equipments, the user interface 630 may also be the interface capable of inter-connecting or exter-connecting with the required devices, and the connected devices include but not limited to keypad, display, loudspeaker, microphone, joystick and the like.

The processor 600 is responsible for managing the bus architecture and general processing, and the memory 620 may store the data used by the processor 600 when performing the operations.

Optionally, the processor 600 can be Central Processing Unit (CPU), Application Specific Integrated Circuit (ASIC), Field-Programmable Gate Array (FPGA) or Complex Programmable Logic Device (CPLD).

Figure 11:
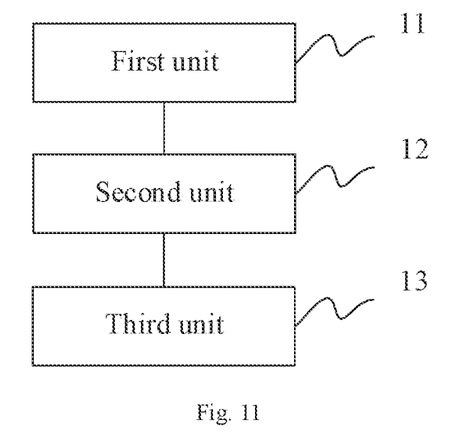
FIG. 11 is a schematic structural diagram of another positioning apparatus at the location server side according to an embodiment of the application.

At the location server side, referring to FIG. 11, another positioning apparatus according to an embodiment of the application includes: a first unit 11 configured to obtain the positioning capability supported by a UE, and determine, according to the positioning capability, that the UE is capable of obtaining positioning measurements by detecting an ioPRS for indoor/outdoor positioning; a second unit 12 configured to obtain the positioning assistance data including the ioPRS configuration data, and transmit the positioning assistance data to the UE; a third unit 13 configured to obtain the positioning measurements provided by the UE, and position the UE based on the positioning measurements, the positioning measurements are obtained by the UE based on the ioPRS.

Figure 12:
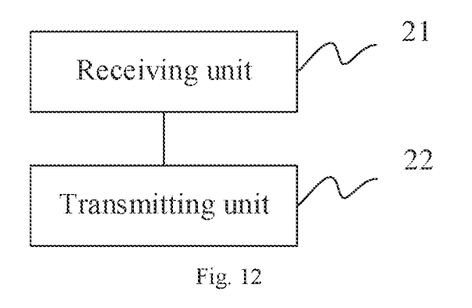
FIG. 12 is a schematic structural diagram of another positioning apparatus at the base station side according to an embodiment of the application.

At the base station side, referring to FIG. 12, another positioning apparatus according to an embodiment of the application includes: a receiving unit 21 configured to receive an OTDOA information request transmitted by a location server; a transmitting unit 22 configured to transmit an OTDOA information response carrying the positioning assistance data to the location server, where the positioning assistance data includes the ioPRS configuration data, the ioPRS is for indoor/outdoor positioning.

Figure 13:
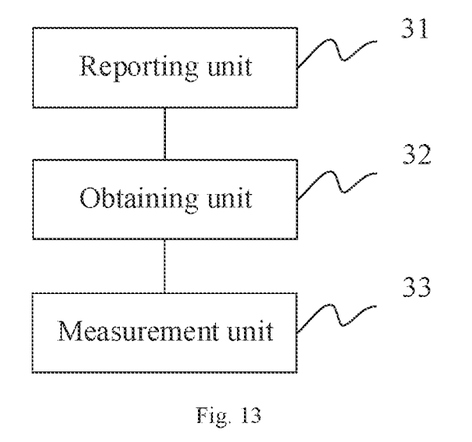
FIG. 13 is a schematic structural diagram of another positioning apparatus at the user equipment side according to an embodiment of the application.

At the UE side, referring to FIG. 13, another positioning apparatus according to an embodiment of the application includes: a reporting unit 31 configured to report the positioning capability supported by a UE to the network side, where the positioning capability is used by the network side to determine that the UE is capable of obtaining positioning measurements by detecting an ioPRS for indoor/outdoor positioning; an obtaining unit 32 configured to obtain the positioning assistance data including ioPRS configuration data; a measurement unit 33 configured to measure downlink signals including the ioPRS based on the ioPRS configuration data to obtain positioning measurements, and report the positioning measurements to the network side.

An embodiment of the present application provides a computing device, which can be a desktop computer, a portable computer, a smart phone, a tablet computer, a Personal Digital Assistant (PDA) or the like. The computing device can include a Center Processing Unit (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In an embodiment of the application, the memory may be used to store the program of any one of the methods provided by the embodiments of the application.

The processor invokes the program instructions stored in the memory and is configured to perform any one of the methods according to the embodiments of the application in accordance with the obtained program instructions.

An embodiment of the application provides a computer storage medium for storing the computer program instructions used by the apparatuses according to the embodiments of the application described above, where the computer storage medium stores the program for performing any one of the methods according to the embodiments of the application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods according to the embodiments of the application may be applied to the user devices, and may also be applied to the network devices.

The user device can also referred to as User Equipment ("UE" for short), Mobile Station ("MS" for short), Mobile Terminal ("MT" for short) or the like. Optionally, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device may be a base station (e.g., access point), a server, etc., wherein the base station refers to the device in the access network communicating with the wireless terminal via one or more sectors over the air interface. The base station may be used to perform the inter-conversion between the received air frame and the IP packet, and used as the router between the wireless terminal and the rest of the access network, wherein the rest of the access network may include Internet Protocol (IP) networks. The base station may further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like, which is not limited in the embodiments of the application.

The processing flows of the above methods may be implemented by a software program, which may be stored in a storage medium. When the stored software program is invoked, the above method steps are performed.

In summary, similar to the TC-OFDM positioning signal, the ioPRS includes a high-power positioning signal (that is, the first PRS described above) and a low-power positioning signal (that is, the second PRS described above). The low-power positioning signal is also transmitted together with the OFDM signals for data communication. Unlike the TC-OFDM, the high-power positioning signal and low-power positioning signal included in the ioPRS are both based on OFDM PRS signals instead of CDMA PN sequences. Compared with the TC-OFDM positioning signal, the ioPRS has the following advantages.

Simple implementation: the TC-OFDM requires the base station/UE to transmit/receive the CDMA and OFDM signals simultaneously; while the ioPRS does not require the BS and UE to process the CDMA signals, which makes the implementations of the BS and especially the UE easier and simpler.

Flexible configuration: for the TC-OFDM, the transmission bandwidth is limited by the design of the PN sequence, so it is difficult to configure and adjust the signal transmission bandwidth flexibly, and furthermore, the power of the PN sequence is evenly distributed on the spectrum of the transmission bandwidth and cannot be adjusted according to the transmission of the OFDM signals for data communication; while the ioPRS itself is an OFDM signal, so it is easy to configure the carrier bandwidth and configure it at any position in the bandwidth.

Interference control: the TC-OFDM transmission power is evenly distributed in the bandwidth of the PN positioning signal; and it is impossible to freely adjust and control the mutual interference between the positioning signals, and adjust the mutual interference between the positioning signals and data communication signals according to the transmission of the OFDM signals for data communication; for the ioPRS, the PRS REs can be placed freely in the carrier bandwidth, and it is possible to freely adjust and control the mutual interference between the positioning signals as well as between the positioning signals and data communication signals.

That is, the embodiments of the application reduce the system resources used for the PRS in the actual OTDOA system while ensuring the same OTDOA positioning performance; and the technical solutions of the embodiments of the application can provide the better positioning performance, and are especially suitable for the indoor environment where the UE is in slow motion and static state. Due to the alternate transmissions of PRS-H and PRS-L signals, the PRS signals transmitted by the base station are actually continuous. Then, the UE can continuously measure and track the PRS signals from multiple neighbor cells to achieve the continuous positioning and tracking. In addition, if the UE can phase-lock the phases of the continuously transmitted PRS signals through the phase-locked loop, the UE can provide the carrier phase measurement for positioning. The very high positioning accuracy can be achieved through the carrier phase measurement.

It should be understood by those skilled in the art that the embodiments of the application can provide methods, systems and computer program products. Thus the present application can take the form of hardware embodiments alone, software embodiments alone, or embodiments combining the software and hardware aspects. Also the application can take the form of computer program products implemented on one or more computer usable storage mediums (including but not limited to magnetic disk memories, CD-ROMs, optical memories and the like) containing computer usable program codes therein.

The application is described by reference to the flow charts and/or the block diagrams of the methods, the devices (systems) and the computer program products according to the embodiments of the application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the application.

Evidently those skilled in the art can make various modifications and variations to the embodiments of the application without departing from the spirit and scope of the embodiments of the application. Thus the application is also intended to encompass these modifications and variations therein as long as these modifications and variations to the embodiments of the application come into the scope of the claims of the application and their equivalents.

What is claimed is:

1. A positioning method, comprises:
    obtaining a positioning capability supported by a User Equipment (UE) and determining, according to the positioning capability, that the UE is capable of obtaining positioning measurements by detecting an indoor/outdoor Positioning Reference Signal (ioPRS) for indoor/outdoor positioning;
    obtaining positioning assistance data comprising ioPRS configuration data for each base station cell, and transmitting the positioning assistance data to the UE;
    obtaining the positioning measurements provided by the UE, and positioning the UE based on the positioning measurements for the each base station cell, wherein the positioning measurements are obtained by the UE based on the ioPRS;
    wherein the ioPRS comprises: a first Positioning Reference Signal (PRS) and a second PRS;
    wherein Energy Per Resource Element (EPRE) of the first PRS is greater than EPRE of the second PRS;
    wherein a transmission bandwidth and positions of the second PRS are the same as a transmission bandwidth and positions of the first PRS or, the second PRS occupies an entire carrier bandwidth;
    wherein a time-domain configuration of the second PRS is transmitted on Orthogonal Frequency Division Multiplexing (OFDM) symbols distinct from OFDM symbols used for transmitting the first PRS.

2. The method according to claim 1, wherein the second PRS is transmitted together with signals for data communication service.

3. The method according to claim 1, wherein the first PRS and the second PRS are alternately transmitted in time.

4. The method according to claim 1, wherein:
    Resource Element (REs) of the second PRS are distributed in a transmission bandwidth of the second PRS, and there is one RE of the second PRS in every three REs;
    or REs of the second PRS are distributed in a transmission bandwidth of the second PRS, and there is one RE of the second PRS in every six REs;
    or REs of the second PRS occupy all REs in a transmission bandwidth of a PRS-L.

5. A positioning method, comprising:
    receiving an Observed Time Difference of Arrival (OTDOA) information request transmitted by a location server;
    transmitting an OTDOA information response carrying positioning assistance data to the location server, wherein the positioning assistance data comprises an indoor/outdoor Positioning Reference Signal (ioPRS) configuration data for each base station cell, the ioPRS is for indoor/outdoor positioning;
    wherein the ioPRS comprises: a first Positioning Reference Signal (PRS) and a second PRS;
    wherein Energy Per Resource Element (EPRE) of the first PRS is greater than EPRE of the second PRS;
    wherein a transmission bandwidth and positions of the second PRS are the same as a transmission bandwidth and positions of the first PRS; or the second PRS occupies an entire carrier bandwidth;
    wherein a time-domain configuration of the second PRS is transmitted on Orthogonal Frequency Division Multiplexing (OFDM) symbols distinct from OFDM symbols used for transmitting the first PRS.

6. The method according to claim 5, further comprising:
    transmitting downlink signals comprising the ioPRS according to the ioPRS configuration data.

7. The method according to claim 6, wherein the second PRS is transmitted together with signals for data communication service.

8. The method according to claim 6, wherein the first PRS and the second PRS are alternately transmitted in time.

9. The method according to claim 6, wherein:
    Resource Element (REs) of the second PRS are distributed in a transmission bandwidth of the second PRS, and there is one RE of the second PRS in every three REs;
    or REs of the second PRS are distributed in a transmission bandwidth of the second PRS, and there is one RE of the second PRS in every six REs;
    or REs of the second PRS occupy all REs in a transmission bandwidth of a PRS-L.

10. A positioning method, comprising:
    reporting a positioning capability supported by a User Equipment (UE) to a network side, wherein the positioning capability is used by the network side to determine that the UE is capable of obtaining positioning measurements by detecting an indoor/outdoor Positioning Reference Signal (ioPRS) for indoor/outdoor positioning;
    obtaining positioning assistance data comprising ioPRS configuration data for each base station cell;
    measuring downlink signals comprising the ioPRS based on the ioPRS configuration data to obtain positioning measurements, and reporting the positioning measurements to the network side;
    wherein the ioPRS comprises: a first Positioning Reference Signal (PRS) and a second PRS;
    wherein Energy Per Resource Element (EPRE) of the first PRS is greater than EPRE of the second PRS;
    wherein a transmission bandwidth and positions of the second PRS are the same as a transmission bandwidth and positions of the first PRS; or the second PRS occupies an entire carrier bandwidth;
    wherein a time-domain configuration of the second PRS is transmitted on Orthogonal Frequency Division Multiplexing (OFDM) symbols distinct from OFDM symbols used for transmitting the first PRS.

11. A positioning apparatus, comprising:
    a memory configured to store program instructions;
    a processor configured to invoke the program instructions stored in the memory and perform the method of claim 1.

12. A non-transitory computer storage medium storing computer executable instructions which are configured to cause the computer to perform the method of claim 1.

13. A positioning apparatus, comprising:
    a memory configured to store program instructions;
    a processor configured to invoke the program instructions stored in the memory and perform the method of claim 5.

14. A positioning apparatus, comprising:
    a memory configured to store program instructions;
a processor configured to invoke the program instructions stored in the memory and perform the method of claim 10.

* * * * *